United States Patent
Lambert et al.

(10) Patent No.: US 12,379,980 B2
(45) Date of Patent: Aug. 5, 2025

(54) SYSTEM AND METHOD FOR MANAGING DATA PROCESSING SYSTEMS BASED ON USER INPUT

(71) Applicant: Dell Products L.P., Round Rock, TX (US)

(72) Inventors: Timothy M. Lambert, Austin, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 18/159,901

(22) Filed: Jan. 26, 2023

(65) Prior Publication Data

US 2024/0256368 A1    Aug. 1, 2024

(51) Int. Cl.
*G06F 9/54* (2006.01)
*G06F 18/30* (2023.01)

(52) U.S. Cl.
CPC .............. *G06F 9/546* (2013.01); *G06F 18/30* (2023.01)

(58) Field of Classification Search
None
See application file for complete search history.

(56) References Cited

U.S. PATENT DOCUMENTS

| | | | |
|---|---|---|---|
| 6,557,170 B1 * | 4/2003 | Wilder | G06F 3/023 710/72 |
| 7,308,705 B2 | 12/2007 | Gordy et al. | |
| 7,970,279 B2 | 6/2011 | Dress | |
| 9,331,899 B2 | 5/2016 | Christopher et al. | |
| 9,450,901 B1 * | 9/2016 | Smullen | H04L 51/046 |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,733,116 B2 | 8/2020 | Litichever et al. | |
| 11,029,742 B2 | 6/2021 | Webel et al. | |
| 11,112,846 B2 | 9/2021 | Strach et al. | |
| 2005/0030970 A1 * | 2/2005 | Britton | H04W 74/0866 370/235 |
| 2008/0126629 A1 | 5/2008 | Huang | |

(Continued)

FOREIGN PATENT DOCUMENTS

| | | | | |
|---|---|---|---|---|
| WO | WO-2007044899 A2 * | 4/2007 | | G08C 23/04 |
| WO | WO 2013150872 A1 * | 10/2013 | | G06F 21/12 |

OTHER PUBLICATIONS

"DC-MHS R1 Overview," 2022 OCP Global Summit (56 Pages).

(Continued)

*Primary Examiner* — Charles E Anya
(74) *Attorney, Agent, or Firm* — WOMBLE BOND DICKINSON (US) LLP

(57) ABSTRACT

Methods and systems for managing operation of data processing systems are disclosed. To manage the operation of the data processing systems, user input may be obtained and used to select how to change the operation of the data processing systems. The user input may be obtained via an interface system. The interface system may be operably connected to a processing complex and a management controller of the data processing system via reconfigurable channels. The channels may be reconfigured to selectively provide the user input to the processing complex or the management controlled based on the state of the data processing system.

20 Claims, 6 Drawing Sheets

(56) References Cited

U.S. PATENT DOCUMENTS

| | | | |
|---|---|---|---|
| 2009/0296640 A1* | 12/2009 | Gilbert | H04W 72/542 370/329 |
| 2009/0300329 A1 | 12/2009 | Naffziger et al. | |
| 2010/0153859 A1* | 6/2010 | Dawson | H04L 51/04 715/757 |
| 2017/0147052 A1 | 5/2017 | Waters et al. | |
| 2021/0034405 A1* | 2/2021 | Halim | G06F 9/452 |
| 2022/0130432 A1 | 4/2022 | Jayapal et al. | |

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

* cited by examiner

SYSTEM AND METHOD FOR MANAGING DATA PROCESSING SYSTEMS BASED ON USER INPUT

FIELD

Embodiments disclosed herein relate generally to operation management. More particularly, embodiments disclosed herein relate to systems and methods to manage operation of data processing systems using user input.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
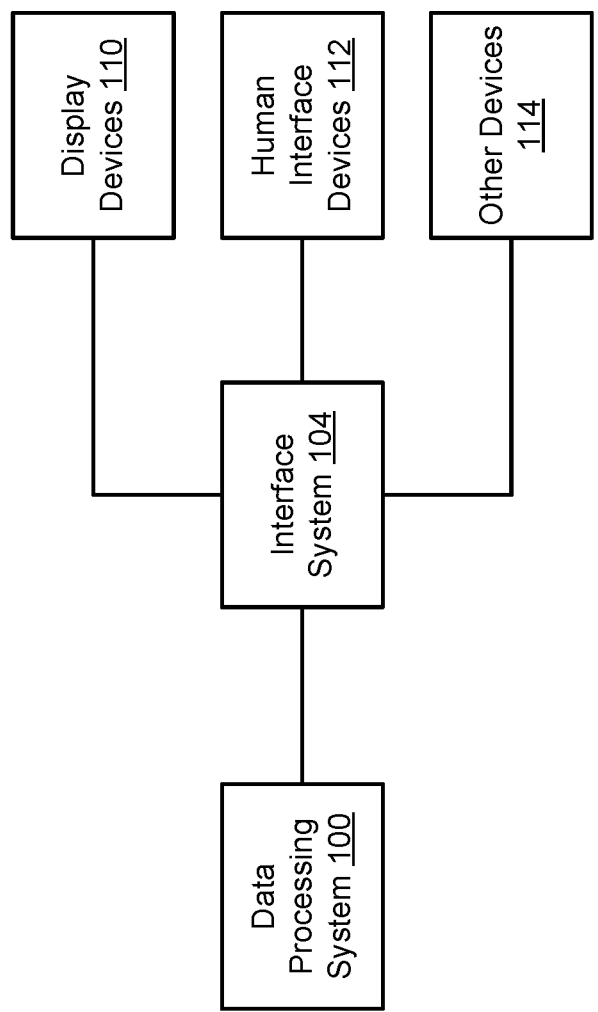
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of the data processing systems, user input may be obtained and processed. The user input may be obtained via an interface system.

The interface system may be operably connected to a processing complex and management controller via reconfigurable channels. The channels may be reconfigured to selectively provide the user input to the management controller or the processing complex, depending on the state of the data processing system.

When the user input is provided to the management controller, the management controller may process the user input and select actions to be performed. When performed, the selected actions may modify the operation of the data processing system. For example, the operation may be modified by changing the state of the data processing system, by providing information to the processing complex to process, and/or via making other types of changes.

By changing the operation of the data processing system, the management controller may facilitate continued processing of user input while the processing complex may ignore or otherwise not process the user input. Consequently, the operation of the data processing system may be consistently managed via the user input provided by the interface system.

In an embodiment, a method for managing operation of a data processing system is provided. The method may include making an identification that the data processing system has entered a state in which output from a interface system to the data processing system is ignored by a processing complex of the data processing system; based on the identification: reallocating a shared channel from the processing complex to a management controller for the data processing system, the shared channel at least in part carrying the output to the processing complex while the shared channel is allocated to the processing complex; while the shared channel is reallocated to the management controller, obtaining user input from the interface system using the shared channel; and performing an action set based on the user input to modify operation of the data processing system.

Obtaining the user input may include performing an enumeration for human interface device operably connected to the interface system to identify at least one human interface device; and obtaining the user input based on a signal generated by the at least one human interface device.

Performing the action set may include identifying a pattern based on the user input; performing a lookup based on the pattern to identify at least one action; and performing the action.

The at least one action may include prompting a user for a password; and using the password to identify an authorization level for the user, the authorization level indicating a set of functions of the data processing system that the user has permission to invoke.

The at least one action may also include identifying a command; and forwarding the command to the processing complex.

The at least one action may further include logging keystrokes on the at least one human interface device.

The at least one action may further include presenting a simulated performance of a command based on the keystrokes to the user.

The at least one action may further include reallocating the shared channel to the processing complex.

The at least one action may further include initiating waking of the processing complex.

The at least one action may further include providing, via the at least one human interface device, feedback to the user. The feedback may indicate at least one characteristic of the data processing system selected from a group of characteristics consisting of: network information for the data processing system; network information for the management controller; a health state of the data processing system; and a boot state of the data processing system.

Reallocating the shared channel from the processing complex to the management controller may include powering a port of the data processing system which operably connects the shared channel to the interface system; and modifying a configuration of a multiplexer that selectively operably connects the shared channel to the management controller and the processing complex, the modified configuration disconnecting the shared channel from the processing complex and operably connecting the shared channel to the management controller.

In an embodiment, a non-transitory media is provided. The non-transitory media may include instructions that when executed by a processor cause the computer implemented method to be performed.

In an embodiment, a data processing system is provided. The data processing system may include the non-transitory media, a processing complex, and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown). Different data processing systems may provide similar and/or different computer implemented services.

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

To provide the computer implemented services, data processing system 100 may provide information to users of the system (e.g., by displaying information via display devices 110), obtain information from the user (e.g., by receiving it via human interface devices 112), and/or otherwise use the functionality of other devices 114 operably connected to data processing system 100.

To operably connect display devices 110 (e.g., video display devices such as computer monitors), human interface devices 112 (e.g., mouse, keyboard, etc.), and/or other devices 114 (e.g., in aggregate referred to as "peripheral devices") to data processing system, interface system 104 may be used. Interface system 104 may be implemented using, for example, a keyboard, video, and mouse (KVM) switch. The KVM switch may operably attached to one or more ports of data processing system 100 thereby facilitating communications between data processing system 100 and these peripheral devices.

Figure 2A:
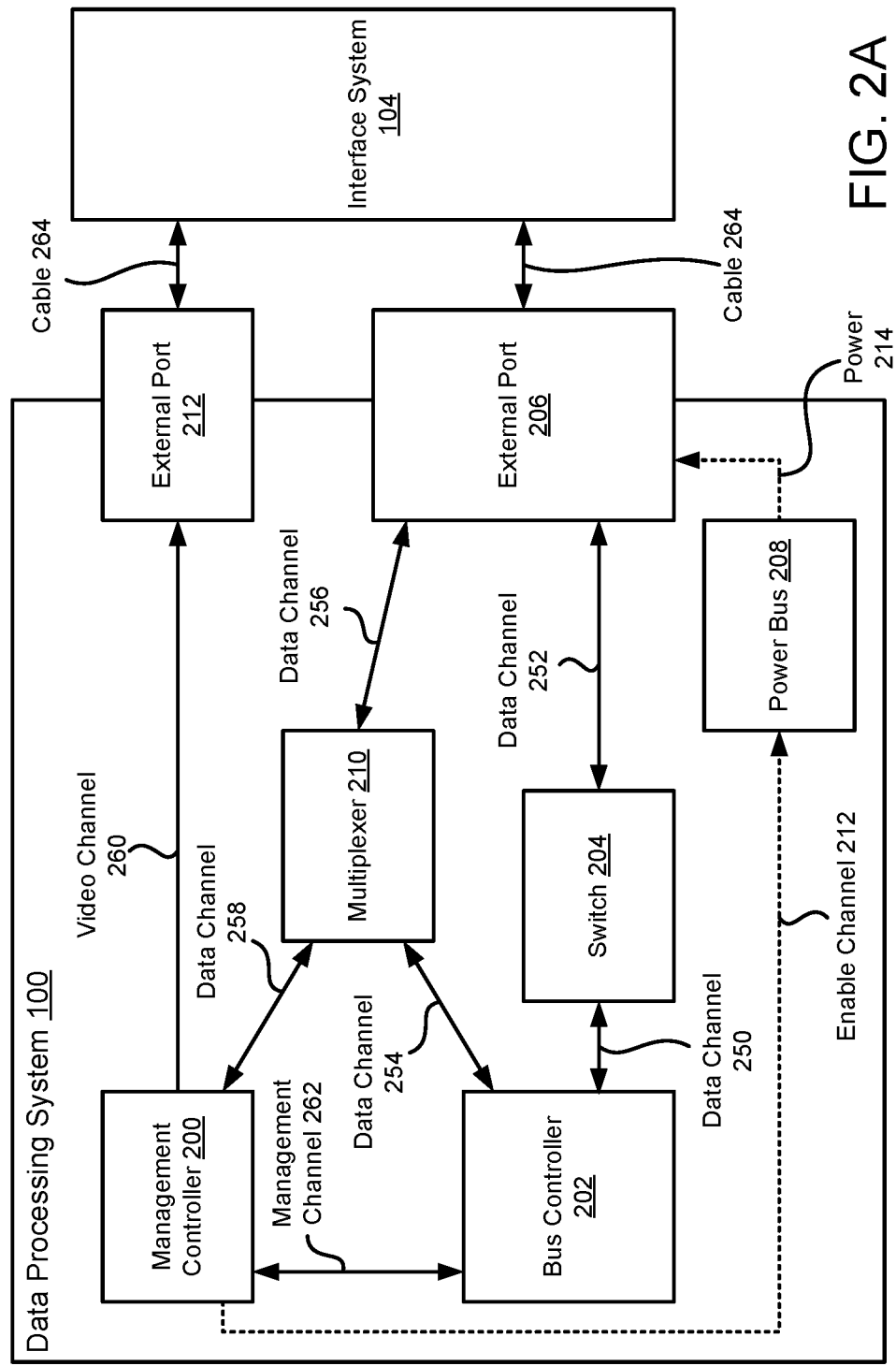
FIGS. 2A-2C show diagrams illustrating connectivity of a system in accordance with an embodiment.
Figure 2B:
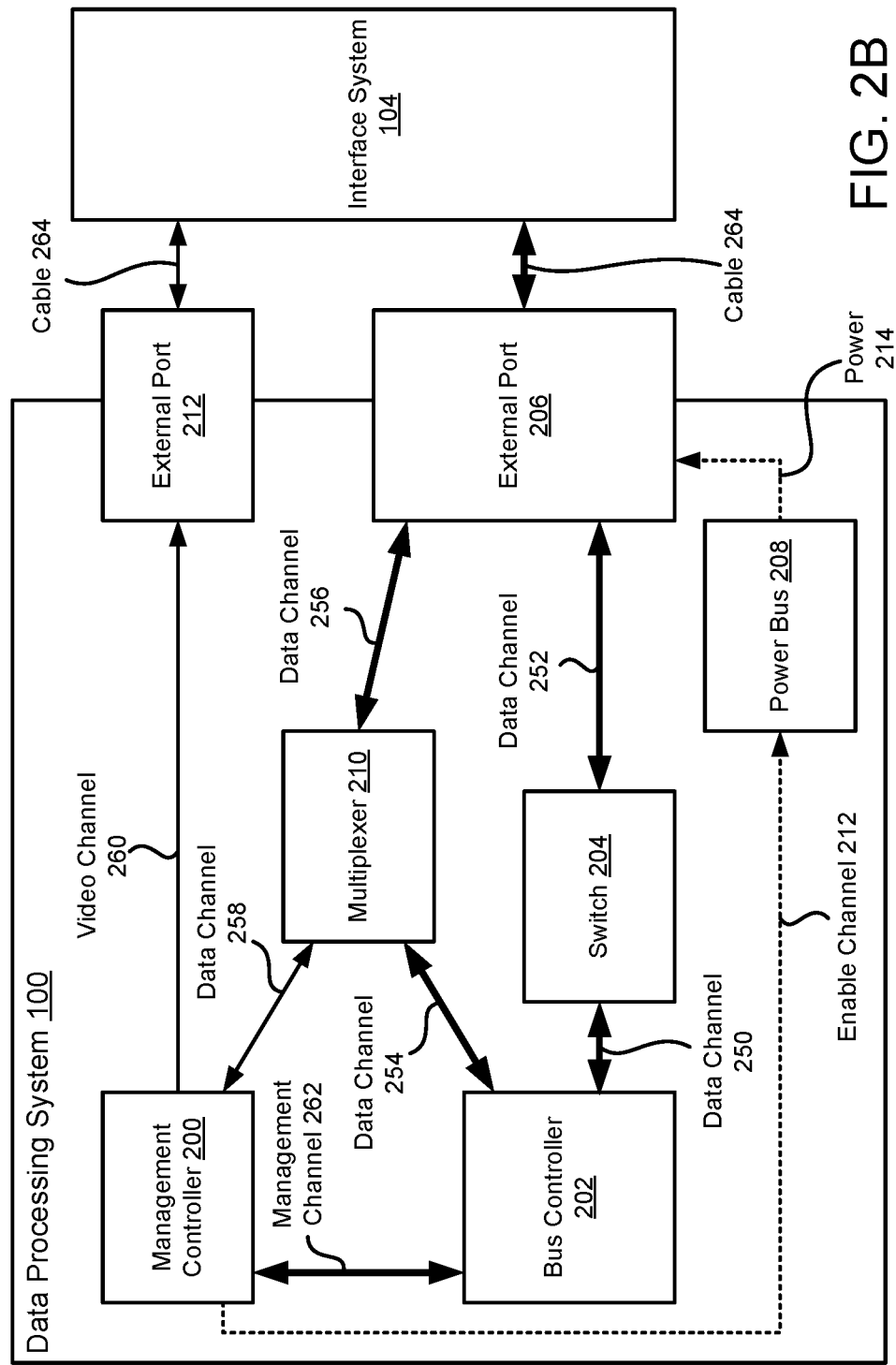

During operation, processing complexes (e.g., processors and memory) may enter different states for varying reasons. For example, to conserve power the processing complexes may enter a hibernation state where various functions of the processing complexes are disabled, some of the components of data processing system 100 a depowered, and/or other actions that may limit the functionality of data processing system 100 may be performed. In some of these states, communications between the processing complex and interface system 104 may be disabled. For example, power to components of data processing system 100 that facilitate the communications may be removed thereby rendering interface system 104 unable to communicate with the processing complexes. Accordingly, a user that uses the peripheral devices to provide information used by the processing complexes in providing computer implemented services may be deprived of the ability to do so. Refer to FIGS. 2A-2B and the corresponding discussion for additional details regarding the inability of users of the peripheral devices to provide user input to data processing system.

Depending on the form factor through which data processing system 100 is implemented, it may be challenging to provide user input to the processing complex of data processing system 100 using other elements of data processing system 100 (e.g., that may remain in operable communication with the processing complex and/or other portions of data processing system 100 while interface system 104 is not operably connected to the processing complex). For example, if data processing system 100 is implemented using a rack mount chassis positioned in a secure rack, buttons and/or other interface elements on the rack mount chassis and through which user input may be provided may be difficult to physically access.

In general, embodiments disclosed herein may provide methods, systems, and/or devices for managing operation of data processing system 100 using user input obtained via interface system 104. To manage the operation of data processing system 100, data processing system 100 may include a switching system that reroutes at least some communications between interface system 104 and processing complex to other portions of data processing system.

Once rerouted, the other portions of data processing system may utilize user input obtained via the communications to manage the operation of data processing system 100. For example, while data processing system 100 enters a state in which the processing complex ignores communications from interface system 104, internal communication paths of data processing system 100 may be modified to reroute the communications to other portions of data processing system 100 that may take action based on the communications. In this manner, user input obtained via the peripheral devices (e.g., 110-114) may be used to manage the operation of data processing system 100 regardless of the state of data processing system 100.

To manage the operation of data processing system 100, the user input may be interpreted by a management controller of data processing system 100. The management controller may identify patterns in the user input and perform one or more actions (e.g., an action set) based on the identified patterns. The actions may include, for example, modifying the state of data processing system 100 thereby causing processing complexes to no longer ignore communications from interface system 104, keylogging and/or performing other surveillance actions, validating a user of data processing system, powering various portions of data processing system 100 that may be depowered such as a processing complex, etc.

By managing the operation of data processing system 100 based on all user input obtained via interface system 104 regardless of state of data processing system 100, the user experience for managing data processing system 100 may be improved. For example, administrators or other persons may utilize the peripheral devices for most management functions which otherwise may require the administrators to interact with a range of interface elements (e.g., buttons on chassis, etc.) to manage the operation of data processing system 100.

Figure 3:
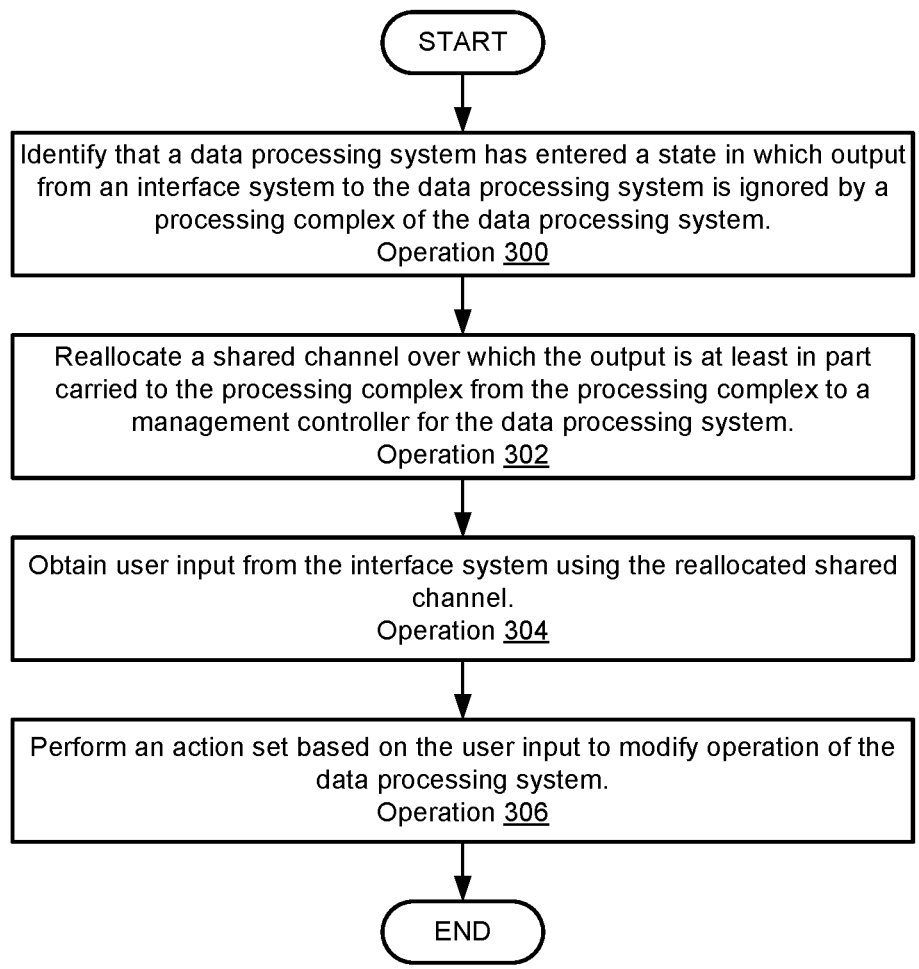
FIG. 3 shows a flow diagram illustrating a method of managing the operation of data processing systems in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Data processing system 100 may be implemented with multiple computing devices. The computing devices of data processing system 100 may cooperatively perform the functionality of data processing system 100. The computing devices of data processing system 100 may perform similar and/or different functions.

While illustrated in FIG. 1 as included a limited number of specific components, a system in accordance with an embodiment may include fewer, additional, and/or different components than those illustrated therein.

Figure 2C:
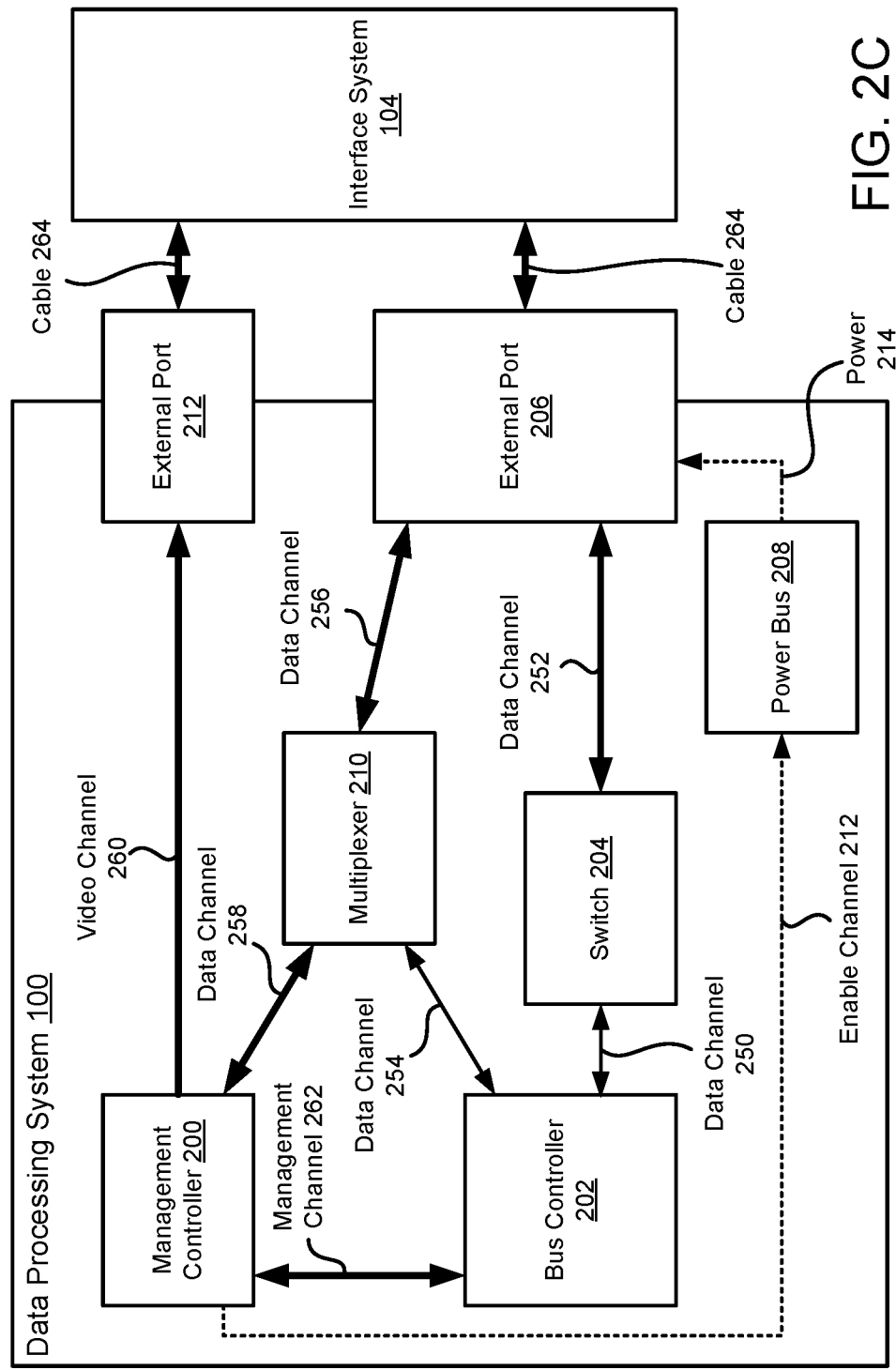

To further clarify embodiments disclosed herein, diagrams illustrating communication paths between data processing system 100 and interface system 104 in accordance with an embodiment are shown in FIGS. 2A-2C.

Turning to FIG. 2A, a first communication topology diagram in accordance with an embodiment is shown. To facilitate communications between a processing complex (not shown) and interface system 104, data processing system 100 may include bus controller 202, switch 204, and external port 206. These components may support a set of communication channels between interface system 104, and are described below.

Bus controller 202 may be an interface controller (e.g., universal serial bus (USB)) that obtains communications via one or more channels (e.g., 254, 250), and provides the communications to a processing complex (not shown, may be operably connected via any type of channel). Bus controller 202 may be separate from or a part of the processing complex.

Switch 204 may be a communication switch (e.g., a USB switch) that operably connects external port 206 to bus controller 202 via data channel 250 and data channel 252. These data channels may form a static channel between external port 206 and bus controller 202. The static channel may always be allocated to the processing complex, even if the processing complex is not processing communications via the static channel.

External port 206 may include one or more powered ports through which interface system 104 may be operably connected to data processing system 100. For example, external port 206 may include one more receptacles for cables that physically connect interface system 104 and external port 206. External port 206 may also include, for example, powered chips and/or other elements for generating and/or managing electrical signals transmitted via the cables interconnecting external port 206 and interface system 104. When an electrical signal is received by external port 206, data from the signal may be transmitted to switch 204 and/or multiplexer 210 (e.g., depending on which receptacle through which the electrical signal was received).

External port 206 may be powered by power bus 208. Power bus 208 may be managed by the processing complex and management controller 200. For example, the processing complex and management controller 200 may each instruct power bus 208 to provide power 214 to external port 206. So long as at least one is instruction power bus 208 to power external port 206, power bus 208 may power external port 206.

To instruct power bus 208 to power external port 206, management controller 200 may be operably connected to an enable input (e.g., that controls whether power is output based on a high or low signal on the enable input) of power bus 208 via enable channel 212. Consequently, management controller 200, like the processing complex, may instruct power bus 208 to provide power to external port 206. Similar connections (not shown) may exist for the processing complex to instruct power bus 208. In FIG. 2A, channels supporting management and distribution of power are illustrated with dashed lines terminating in at least one arrow, and channels through which data is transmitted are illustrated using solid lines terminating in at least one arrow.

When data processing system 100 enters certain states (e.g., low power states such as S5, other types of states), the processing complex may no longer instruct power bus 208 to power external port 206. Consequently, external power 206 may be deactivated unless management controller 200 instructs power bus 208 to power external port. Accordingly, while external port 206 is disabled, interface system 104 may be unable to communicate with the processing complex.

To continue to ensure that communications from interface system 104 are processed while data processing system 100 is in these certain states, data processing system 100 may include management controller 200 and multiplexer 210.

Multiplexer 210 may be used to flexibly place bus controller 202 or management controller 200 in communication with external port 206. While the processing complex is in certain states (e.g., ignoring communications from interface system 104 by attempting to depower external port 206), multiplexer 210 may place management controller 200 in operable communication with external port via data channel 256 and data channel 258 (e.g., through signal/data multiplexing). While the processing complex is not in the certain states (e.g., attempting to power external port 206), multiplexer 210 may place bus controller 202 in operable communication with external port via data channel 256 and data channel 254.

Multiplexer 210 may, therefore, selectively reallocate use of data channel 256 (e.g., a shared channel) to management controller 200 or the processing complex, depending on the state of data processing system 100. For example, multiplexer 210 may reallocate the shared channel to management controller 200 while the processing complex is ignoring communications from interface system 104.

Management controller 200 may facilitate continued processing of communications from interface system 104 while bus controller 202 is ignoring communications from interface system 104. To do so, management controller 200 may power external port 206 (e.g., by instructing power bus 208 to do so via enable channel 212) while the processing complex does not instruct or otherwise cause power bus 208 to power external port 206. By doing so, while external port 206 would otherwise be depowered, external port 206 may remain powered thereby facilitating collection and transmission of data via data channel 256 toward management controller 200. Multiplexer 210 may forward the data to management controller 200.

Once received, management controller 200 may process the data to, for example, identify user input and take action based on the user input. To take action, management controller 200 may also be operably connected to interface system 104 through video channel 260 and external port 206 (e.g., another powered port, but may be of a different form factor from external port 206 and may facilitate transmission of video data) and the processing complex via management channel 262. Management controller 200 may generate and transmit signals via video channel 260 and external port 206 that may be used to drive a display or other device attached via interface system 104. Likewise, management controller may forward information to the processing complex and/or otherwise communicate with the processing complex via management channel 262.

Any of the channels (e.g., 250-260) may be implemented using, for example, sets of electrical conductors (e.g., circuit card traces, cabling, etc.) that facilitate transmission of electrical signals.

In an embodiment, data channel 252 is implemented as a host 3.0 USB channel.

In an embodiment, data channel 254, data channel 258, and data channel 256 are implemented as a 2.0 USB channel.

In an embodiment, management channel 262 is implemented as a device link, such as a virtual USB device link. The virtual link may be supported by any type of physical communication system.

Cable 264 may be implemented using any type of cable topology. The instances of cable 264 shown in FIG. 2B may be implemented using similar or different topologies.

Turning to FIG. 2B, a second communication topology diagram in accordance with an embodiment is shown. The communication topology shown in FIG. 2B may be identical to the topology shown in FIG. 2A. However, to clarify the channels that are active while the processing complex is not ignoring communications from interface system 104, the thickness of the lines corresponding to these channels has been increased.

As seen in FIG. 2B, bus controller 202 may be operably connected to external port 206 via two separate paths. The first path may include data channel 250 and data channel 252. The second path may include data channel 254 and data channel 256. In this configuration, the processing complex may have exclusive use of communication via external port 206.

To enter this configuration, power bus 208 may power external port 206 and multiplexer 210 may multiplex signals/data from external port 206 obtained via data channel 256 to bus controller 202.

Turning to FIG. 2C, a third communication topology diagram in accordance with an embodiment is shown. The communication topology shown in FIG. 2C may be identical to the topology shown in FIG. 2A. However, to clarify the channels that are active while the processing complex is ignoring communications from interface system 104, the thickness of the lines corresponding to these channels has been increased.

As seen in FIG. 2C, bus controller 202 may not be operably connected to external port 206, but management controller 200 may be operably connected to external port 206 via a third path. The third path may include data channel 258 and data channel 256. In this second configuration, management controller 200 may have exclusive use of communication via external port 206.

To enter the second configuration, power bus 208 may power external port 206 (e.g., based on instructions from management controller 200) and multiplexer 210 may multiplex signals/data from external port 206 obtained via data channel 256 to management controller 200 via data channel 258 (e.g., rather than multiplexing to bus controller 202).

In an embodiment, management controller 200 is implemented using a hardware device including circuitry. The hardware device may be, for example, a digital signal processor, a field programmable gate array, or an application specific integrated circuit. The circuitry may be adapted to cause the hardware device to perform the functionality of management controller 200 such as any of the processes discussed with respect to FIGS. 2A-3. Management controller 200 may be implemented using other types of hardware devices without departing embodiment disclosed herein.

In an embodiment, management controller 200 is implemented using a processor adapted to execute computing code stored on a persistent storage that when executed by the processor performs the functionality of management controller 200 discussed throughout this application such as the processes discussed with respect to FIGS. 2A-3. The processor may be a hardware processor including circuitry such as, for example, a central processing unit, a processing core, or a microcontroller. The processor may be other types of hardware devices for processing information without departing embodiment disclosed herein.

In an embodiment, management controller 200 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed with respect to FIGS. 2A-3. For example, the data structures may include lookup tables used to identify actions to be performed when patterns in user input are identified (and/or other criteria are met). Any of these data structures may be implemented using, for example, lists, tables databases, linked lists, unstructured data, and/or other types of data structures.

As discussed above, the components of FIG. 1 may perform various methods to process communications from interface systems. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of processing communications in accordance with an embodiment is shown. The method may be performed by data processing system 100, components thereof such as management controllers, or other components of the system shown in FIG. 1. For example, a management controller that operates independent from, manages the operation of, and is hosted by a data processing system may perform the method.

The management controller may be implemented with an embedded computer that may present a separate network end point from a host data processing system (e.g., either via a separate network interface or by using the host data processing system's network interface).

At operation 300, an identification that a data processing system has entered a state is made. While in the state, output from an interface system to the data processing system is ignored by a processing complex of the data processing system. The identification may be made by tracking a state of the data processing system. The state may be similar to that illustrated in and described with respect FIG. 2C. For example, the state may be a low power state where various components (e.g., a powered port) of the data processing system are normally depowered.

At operation 302, a shared channel is reallocated from the processing complex to a management controller. The shared channel may carry, at least in part, the output from the interface system.

The shared channel may be reallocated by (i) powering a port of the data processing system which operably connects the shared channel to the interface system, and (ii) modifying a configuration of a multiplexer that selectively operably connects the shared channel to the management controller and the processing complex. The modified configuration may disconnect the shared channel from the processing complex and operably connecting the shared channel to the management controller.

The port may be powered by instructing a power bus to power the port. The port may be, for example a USB port.

The configuration of the multiplexer may be modified by, for example, providing a signal that indicates the configuration to the multiplexer. For example, the signal may be provided to an enable input of the multiplexer that controls how it multiplexes signals.

In an embodiment, the shared channel is reallocated only when a display is operably connected to the data processing system via the input system. For example, the multiplexer may limit its configurability based on the presence, or lack thereof, and the management controller may only instruct the port to be powered while a monitor is operably connected to the interface system. Doing so may reduce the likelihood of an undesired attachment of a USB device to the data processing system from occurring.

At operation 304, user input is obtained from the interface system using the reallocated shared channel. The user input may be obtained by (i) performing an enumeration for human interface device operably connected to the interface system to identify at least one human interface device, and (ii) obtaining the user input based on a signal generated by the at least one human interface device. For example, a user may actuate the human interface device which may generate a signal. The signal may be transmitted to the port, which may forward the signal through the multiplexer to the management controller.

At operation 306, an action set is performed based on the user input. Performance of the action set may modify operation of the data processing system. The action set may be performed by identifying one or more actions. The actions may be identified by performing lookups or other operations in a data structure that associates portions of the user input with actions. The lookup may return the actions for the action set. The actions may include any number and types of actions.

In an embodiment, the action set includes performing one or more security validations. For example, the action set may require a user to enter a password. If the user cannot be validated, then the user may be screened from using the functionality of the data processing system.

In an embodiment, the action set includes enabling attachment of a mass storage device to the data processing system (e.g., which may otherwise be barred from occurring).

In an embodiment, the action set includes forwarding data (e.g., reflecting key sequences, mouse inputs, etc.) to a processing complex of the data processing system for further processing.

In an embodiment, the action set includes logging data (e.g., reflecting keystrokes, time of the keystrokes, etc.) obtained from a user of the data processing system. If the user is suspected of being nefarious, the actions may include presenting a simulated performance of a command indicated by the logged data. The actual command may not be performed.

In an embodiment, the action set includes performing a script or other sequence of operations configured by a user and corresponding to a pattern in the user input.

In an embodiment, the action set includes reallocating the shared channel to the processing complex (e.g., by modifying configuration of the multiplexer and/or depowering the port).

In an embodiment, the action set includes waking the processing complex or otherwise causing the data processing system to enter a different state.

In an embodiment, the action set includes modifying operation of the management controller (e.g., taking over operation of displays), and configuring the management controller (e.g., to eliminate some operations such as monitor takeover).

In an embodiment, the action set includes recording a sequence of keystrokes, establishing a repeatable pattern based on the keystrokes, and repeating the repeatable pattern when a certain user input is received in the future.

In an embodiment, the action set includes providing feedback to the user. The feedback may be provided by activating lights, displaying images, etc. The feedback may convey information such as network information (e.g., an internet protocol address for the host data processing system and/or management controller, media access control address for the host data processing system and/or management controller, etc.), a health state of the data processing system or portions thereof, a boot state (e.g., whether a boot is in process, scheduled for performance, completed, a type of the boot, etc.) for the data processing system or portions thereof, and/or other types of information.

The method may end following operation 306.

Using the method illustrated in FIG. 3, a system in accordance with an embodiment may be more likely to continue to process user input from input systems regardless of a state of a data processing system. By doing so, the usability of a data processing system may be improved.

Figure 4:
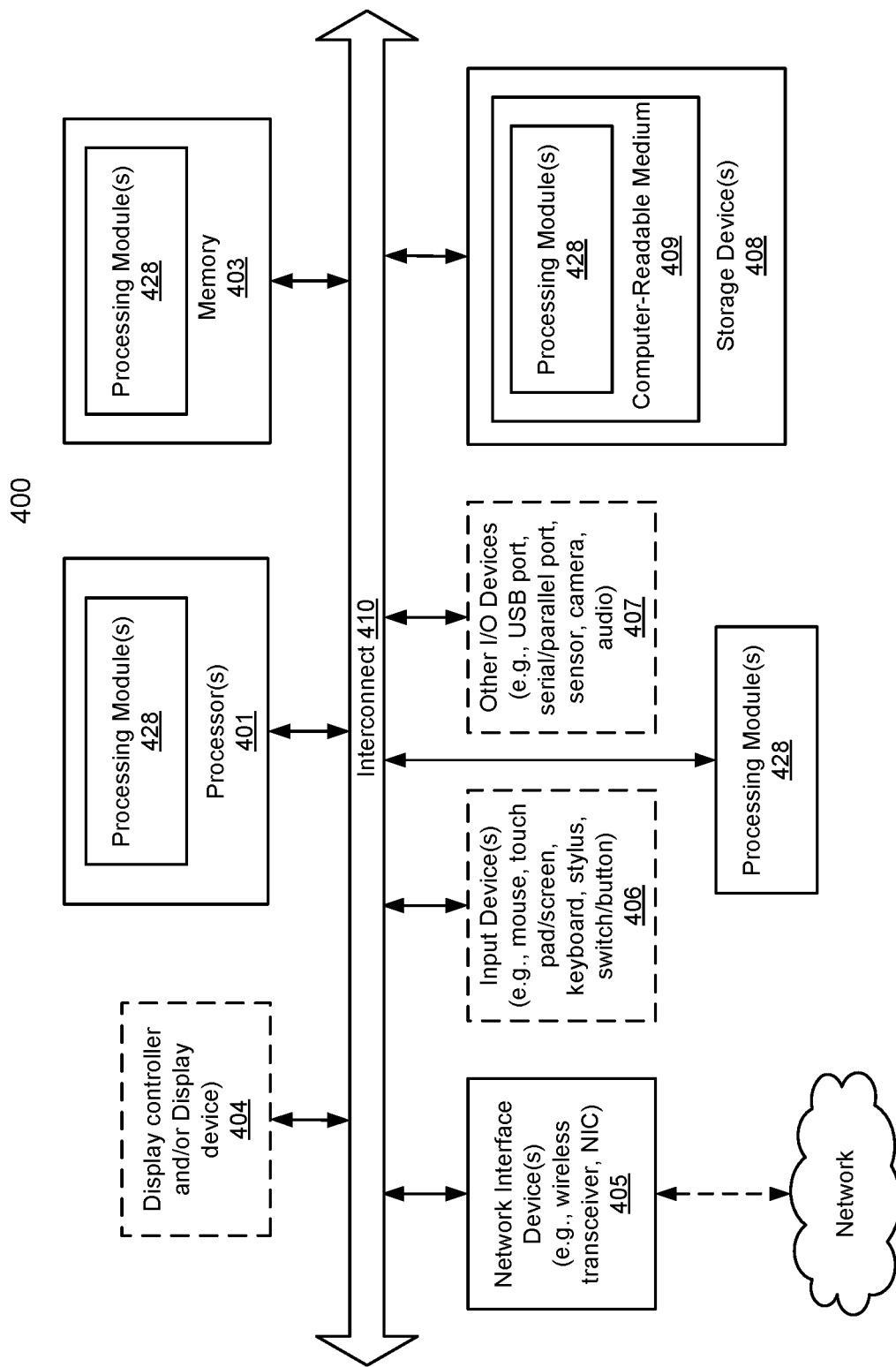
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    making an identification that the data processing system has entered a state in which output from an interface system to the data processing system is ignored by a processing complex of the data processing system, the interface system comprises a peripheral devices switch;
    based on the identification:
        reallocating a shared channel from the processing complex to a management controller for the data processing system, the shared channel at least in part carrying the output to the processing complex while the shared channel is allocated to the processing complex, and the reallocating of the shared channel comprises at least powering a port of the data processing system that operably connects the shared channel to the interface system;
while the shared channel is reallocated to the management controller, obtaining user input from the interface system using the shared channel; and
performing an action set based on the user input to modify operation of the data processing system.

2. The method of claim 1, wherein obtaining the user input comprises:
performing an enumeration for human interface device operably connected to the interface system to identify at least one human interface device; and
obtaining the user input based on a signal generated by the at least one human interface device.

3. The method of claim 2, wherein performing the action set comprises:
identifying a pattern based on the user input;
performing a lookup based on the pattern to identify at least one action; and
performing the action.

4. The method of claim 3, wherein the at least one action comprises:
prompting a user for a password; and
using the password to identify an authorization level for the user, the authorization level indicating a set of functions of the data processing system that the user has permission to invoke.

5. The method of claim 4, wherein the at least one action further comprises:
identifying a command; and
forwarding the command to the processing complex.

6. The method of claim 4, wherein the at least one action further comprises:
logging keystrokes on the at least one human interface device.

7. The method of claim 6, wherein the at least one action further comprises:
presenting a simulated performance of a command based on the keystrokes to the user.

8. The method of claim 4, wherein the at least one action further comprises:
reallocating the shared channel to the processing complex.

9. The method of claim 4, wherein the at least one action further comprises:
initiating waking of the processing complex.

10. The method of claim 4, wherein the at least one action further comprises:
providing, via the at least one human interface device, feedback to the user.

11. The method of claim 10, wherein the feedback indicates at least one characteristic of the data processing system selected from a group of characteristics consisting of:
network information for the data processing system;
network information for the management controller;
a health state of the data processing system; and
a boot state of the data processing system.

12. The method of claim 1, wherein reallocating the shared channel from the processing complex to the management controller further comprises:
modifying a configuration of a multiplexer that selectively operably connects the shared channel to the management controller and the processing complex, the modified configuration disconnecting the shared channel from the processing complex and operably connecting the shared channel to the management controller.

13. A non-transitory machine-readable medium having instructions stored therein, which when executed by a processor, cause the processor to perform operations for managing operation of a data processing system, the operations comprising:
making an identification that the data processing system has entered a state in which output from an interface system to the data processing system is ignored by a processing complex of the data processing system, the interface system comprises a peripheral devices switch;
based on the identification:
reallocating a shared channel from the processing complex to a management controller for the data processing system, the shared channel at least in part carrying the output to the processing complex while the shared channel is allocated to the processing complex, and the reallocating of the shared channel comprises at least powering a port of the data processing system that operably connects the shared channel to the interface system;
while the shared channel is reallocated to the management controller, obtaining user input from the interface system using the shared channel; and
performing an action set based on the user input to modify operation of the data processing system.

14. The non-transitory machine-readable medium of claim 13, wherein obtaining the user input comprises:
performing an enumeration for human interface device operably connected to the interface system to identify at least one human interface device; and
obtaining the user input based on a signal generated by the at least one human interface device.

15. The non-transitory machine-readable medium of claim 14, wherein performing the action set comprises:
identifying a pattern based on the user input;
performing a lookup based on the pattern to identify at least one action; and
performing the action.

16. The non-transitory machine-readable medium of claim 15, wherein the at least one action comprises:
prompting a user for a password; and
using the password to identify an authorization level for the user, the authorization level indicating a set of functions of the data processing system that the user has permission to invoke.

17. A data processing system, comprising:
a processing complex; and
a management controller comprising:
a processor; and
a memory coupled to the processor to store instructions, which when executed by the processor, cause the processor to perform operation, the operations comprising:
making an identification that the data processing system has entered a state in which output from an interface system to the data processing system is ignored by a processing complex of the data processing system, the interface system comprises a peripheral devices switch;
based on the identification:
reallocating a shared channel from the processing complex to a management controller for the data processing system, the shared channel at least in part carrying the output to the processing complex while the shared channel is allocated to the processing complex, and the reallocating of the shared channel comprises at least powering a port of the data processing system that operably connects the shared channel to the interface system;

while the shared channel is reallocated to the management controller, obtaining user input from the interface system using the shared channel; and performing an action set based on the user input to modify operation of the data processing system.

18. The data processing system of claim 17, wherein obtaining the user input comprises:

performing an enumeration for human interface device operably connected to the interface system to identify at least one human interface device; and obtaining the user input based on a signal generated by the at least one human interface device.

19. The data processing system of claim 18, wherein performing the action set comprises:

identifying a pattern based on the user input;

performing a lookup based on the pattern to identify at least one action; and performing the action.

20. The data processing system of claim 19, wherein the at least one action comprises:

prompting a user for a password; and using the password to identify an authorization level for the user, the authorization level indicating a set of functions of the data processing system that the user has permission to invoke.

* * * * *